United States Patent [19]
Lo

[11] Patent Number: 5,770,817
[45] Date of Patent: Jun. 23, 1998

[54] RACEWAY BOX WITH REPLACEABLE CABLE AND CONNECTOR RECEPTACLES

[76] Inventor: Jeffrey C. P. Lo, 2405 Coniston Pl., San Marino, Calif. 91108

[21] Appl. No.: 710,721

[22] Filed: Sep. 20, 1996

[51] Int. Cl.[6] .................................................. H02G 3/08
[52] U.S. Cl. ................................. 174/57; 174/53; 174/66
[58] Field of Search ............................ 174/57, 56, 65 R, 174/53; 220/3.7, 32

[56] References Cited

U.S. PATENT DOCUMENTS

| | | | |
|---|---|---|---|
| 5,012,043 | 4/1991 | Seymour | 174/57 |
| 5,216,203 | 6/1993 | Gower | 174/65 R |
| 5,276,279 | 1/1994 | Brownlie et al. | 174/65 R |
| 5,486,650 | 1/1996 | Yetter | 174/53 |
| 5,594,206 | 1/1997 | Klas et al. | 174/56 |

*Primary Examiner*—Kristine L. Kincaid
*Assistant Examiner*—Joseph Waks

*Attorney, Agent, or Firm*—Rabin, Champagne, & Lynt, P.C.

[57] ABSTRACT

A raceway box with replaceable cable and connector receptacles is provided. The raceway box allows easy replacement of various types of connectors when necessary. Further, the raceway box can provide inlet/outlet openings in various directions based on on-site requirements. The interior space of the raceway box is extendible so as to accommodate a large volume of interconnecting cables and wires. The raceway box is composed of a base unit, a plurality of inserts including cable raceway inserts and connector raceway inserts inset on the lateral sides of the raceway box, and a socket panel covering the base unit. The base unit includes a chassis having a plurality of side pieces mounted substantially upright on the edge of said chassis. These side pieces define a corresponding number of receptacles therebetween. The cable raceway insert is used to receive at least a cable into the raceway box, and the connector raceway insert is used to mount one connector therein. The socket panel is formed with at least one opening therethrough for mounting at least one connector therein. The socket panel is mounted on said base unit by means of securing means as screws.

19 Claims, 18 Drawing Sheets

20

20

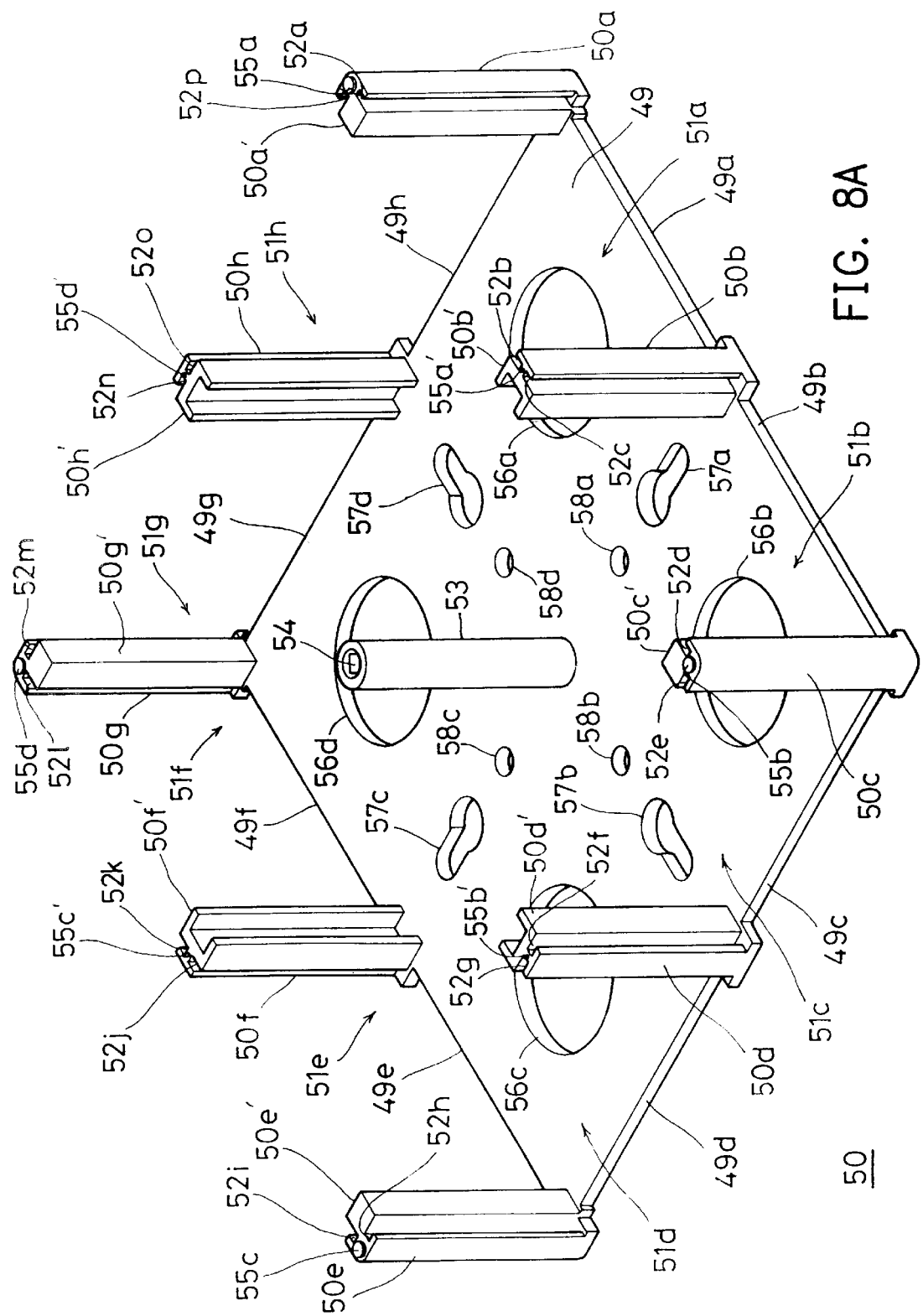

RACEWAY BOX WITH REPLACEABLE CABLE AND CONNECTOR RECEPTACLES

BACKGROUND OF THE INVENTION

1. Field of the Invention

This invention relates to raceway boxes, and more particularly, to a raceway box with replaceable cable and connector receptacles. The raceway box according to the present invention allows the interior space therein to be extendible when the present space is not spacious enough to accommodate all the interconnecting cables and wires therein, and also allows the cable and connector receptacles to be arranged in desired numbers based on on-site requirements.

2. Description of Related Art

A raceway box is a box serving as a hub or node for a network of electrical wires and cables such as twisted pair cables, coaxial cables, optical fibers, and the like. In a computer network, for example, the raceway box is used to connect a plurality of cables which link a number of microcomputers, terminals, workstations, etc. with each other. The raceway box is thus provided with various types of connectors for the connections. A conventional type of raceway box mounts a plurality of connectors on a socket board which allows easy and quick plug-in connections of the cables.

It is a drawback, however, of the foregoing conventional type of raceway box that the connectors thereon are fixedly provided, both in numbers and types, such that when a cable needs a specific type of connector not provided on the socket board, that cable can not be connected. In this case, custom-made socket boards are needed to plug in the different type of connectors, which is quite cost-ineffective. There exists, therefore, a need for a raceway box which allows the connectors provided thereon to be easily replaced with other types of connectors when necessary.

It is another drawback of the conventional type of raceway box that its cable inlet/outlet openings are fixed in positions. When a different design for the raceway layout is desired, a custom-made raceway box that repositions the cable inlet/outlet openings in desired places is needed, which is also quite cost-ineffective. There exists, therefore, a need for a raceway box which allows the cable inlet/outlet openings to be changeable in positions based on on-site requirements.

A still further drawback of the conventional type of raceway box is that its interior space is fixed. Due to this drawback, custom-made raceway boxes should be supplied when the system of cables and wires to be accommodated within the raceway box is too bulky. There exists, therefore, a need for a raceway box which is extendible so as to provide a spacious interior to accommodate a large system of cables and wires therewithin.

SUMMARY OF THE INVENTION

It is a primary objective of the present invention to provide a raceway box which allows the connectors provided thereon to be replaceable with other types of connectors when necessary.

It is another objective of the present invention to provide a raceway box which allows cable inlet/outlet openings to be arranged in various directions when necessary.

It is still another objective of the present invention to provide a raceway box whose interior space is extendible when necessary.

In accordance with the foregoing and other objectives of the present invention, a new and improved raceway box is provided. The raceway box is composed of a base unit, a plurality of inserts including cable raceway inserts and connector raceway inserts inset on the lateral sides of the raceway box, and a socket panel covering the base unit. The base unit includes a chassis having a plurality of side pieces mounted substantially upright on the edge of said chassis. These side pieces define a corresponding number of receptacles therebetween. The cable raceway insert is used to receive at least a cable into the raceway box, and the connector raceway insert is used to mount one connector therein. The socket panel is formed with at least one opening therethrough for mounting at least one connector therein. The socket panel is mounted on said base unit by means of securing means such as screws.

BRIEF DESCRIPTION OF DRAWINGS

The invention can be more fully understood by reading the subsequent detailed description of the preferred embodiments, with reference made to the accompanying drawings, wherein:

FIG. 8A is a perspective view of a base unit employed in a second preferred embodiment of the raceway box of the present invention

DETAILED DESCRIPTION OF THE PREFERRED EMBODIMENTS

First Preferred Embodiment

Figure 1A:
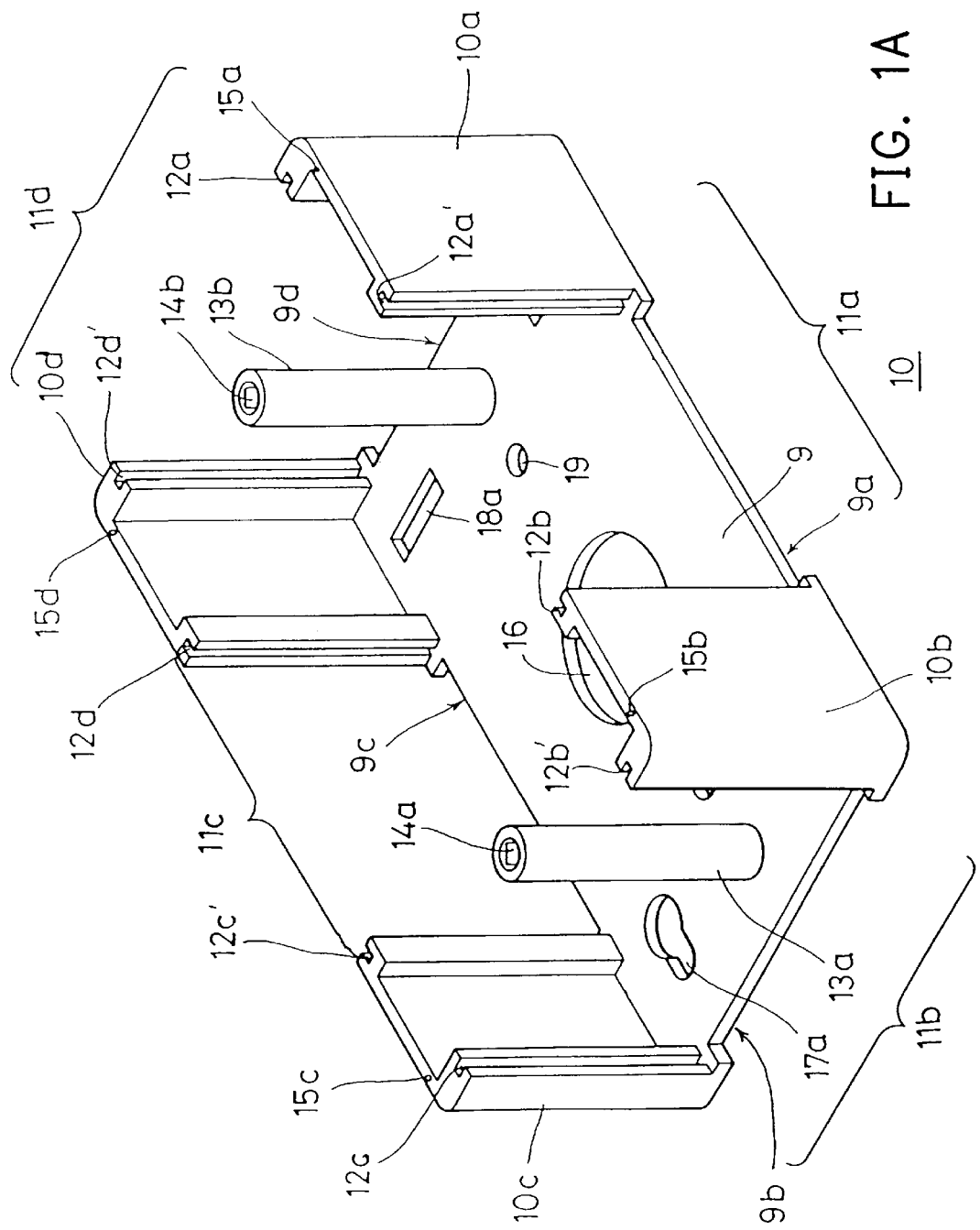
FIG. 1A is a perspective view of a base unit employed in a first preferred embodiment of the raceway box of the present invention.
Figure 1B:
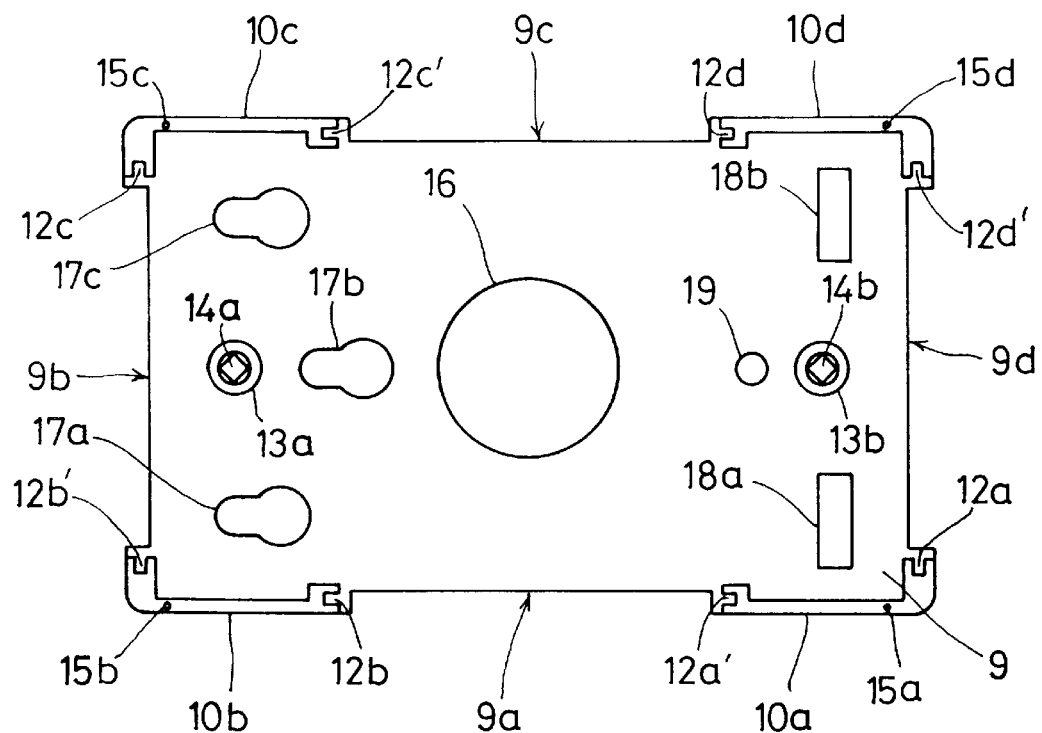
FIG. 1B is a top view of the base unit of FIG. 1A.
Figure 1C:
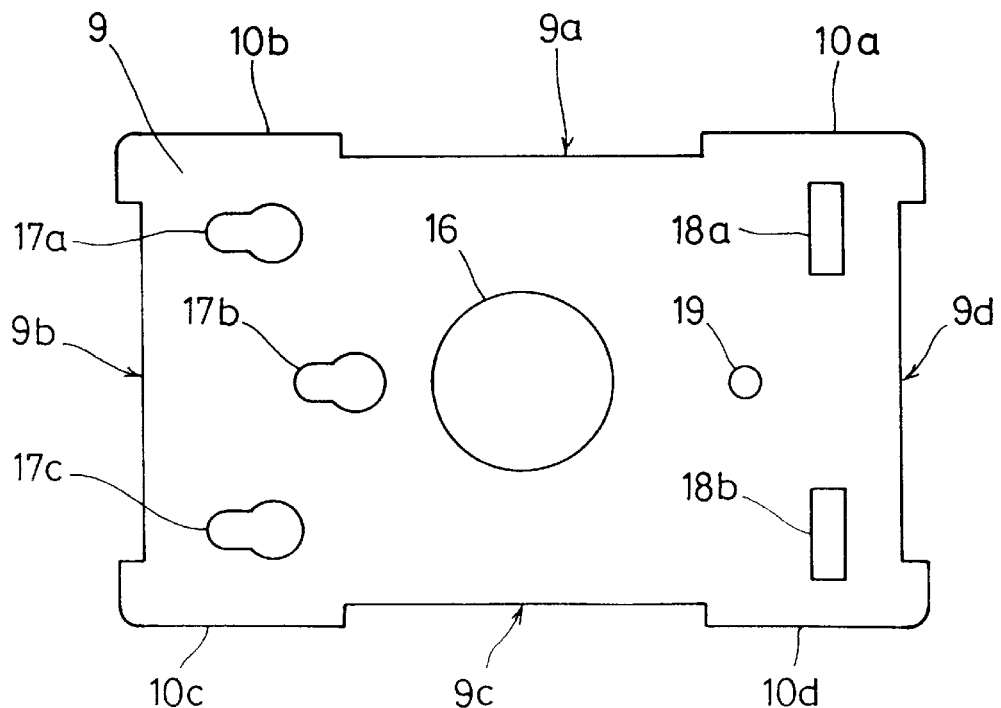
FIG. 1C is a bottom view of the base unit of FIG. 1A.
Figure 2A:
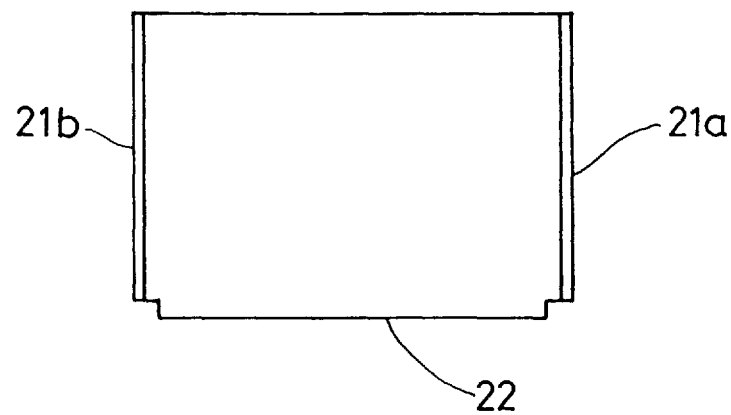
FIG. 2A is a front view of a cable raceway insert employed in the first preferred embodiment of the raceway box of the present invention.
Figure 2B:
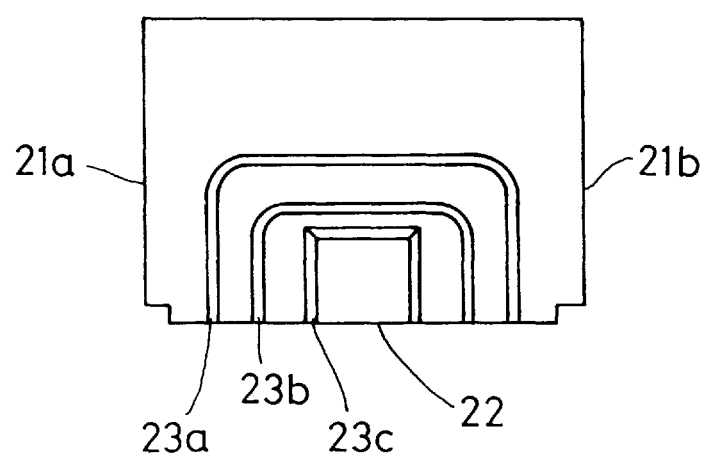
FIG. 2B is a rear view of the cable raceway insert of FIG. 2A.
Figure 3A:
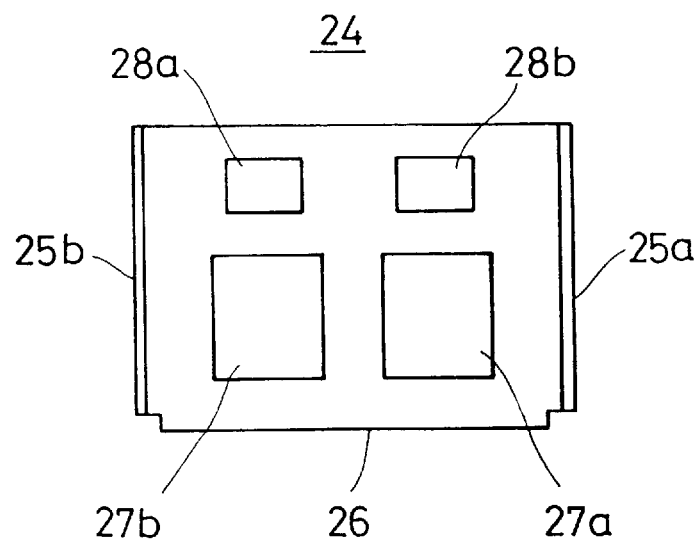
FIG. 3A is a front view of a connector raceway insert employed in the first preferred embodiment of the raceway box of the present invention.
Figure 3B:
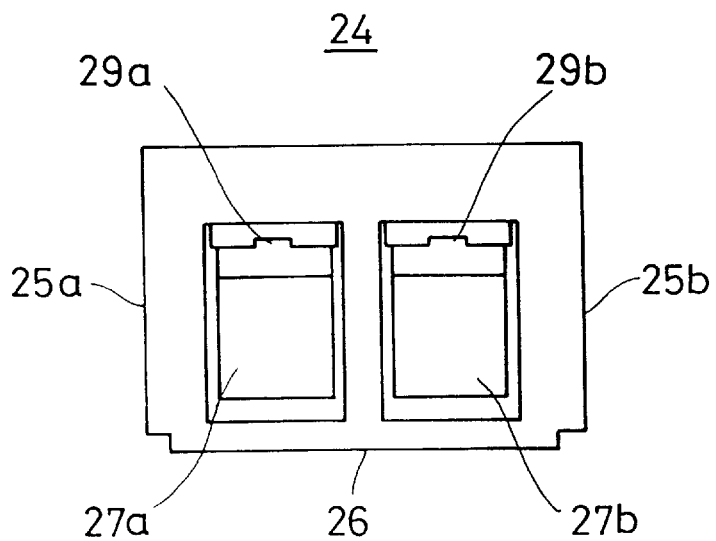
FIG. 3B is a rear view of the connector raceway insert of FIG. 3A.
Figure 4:
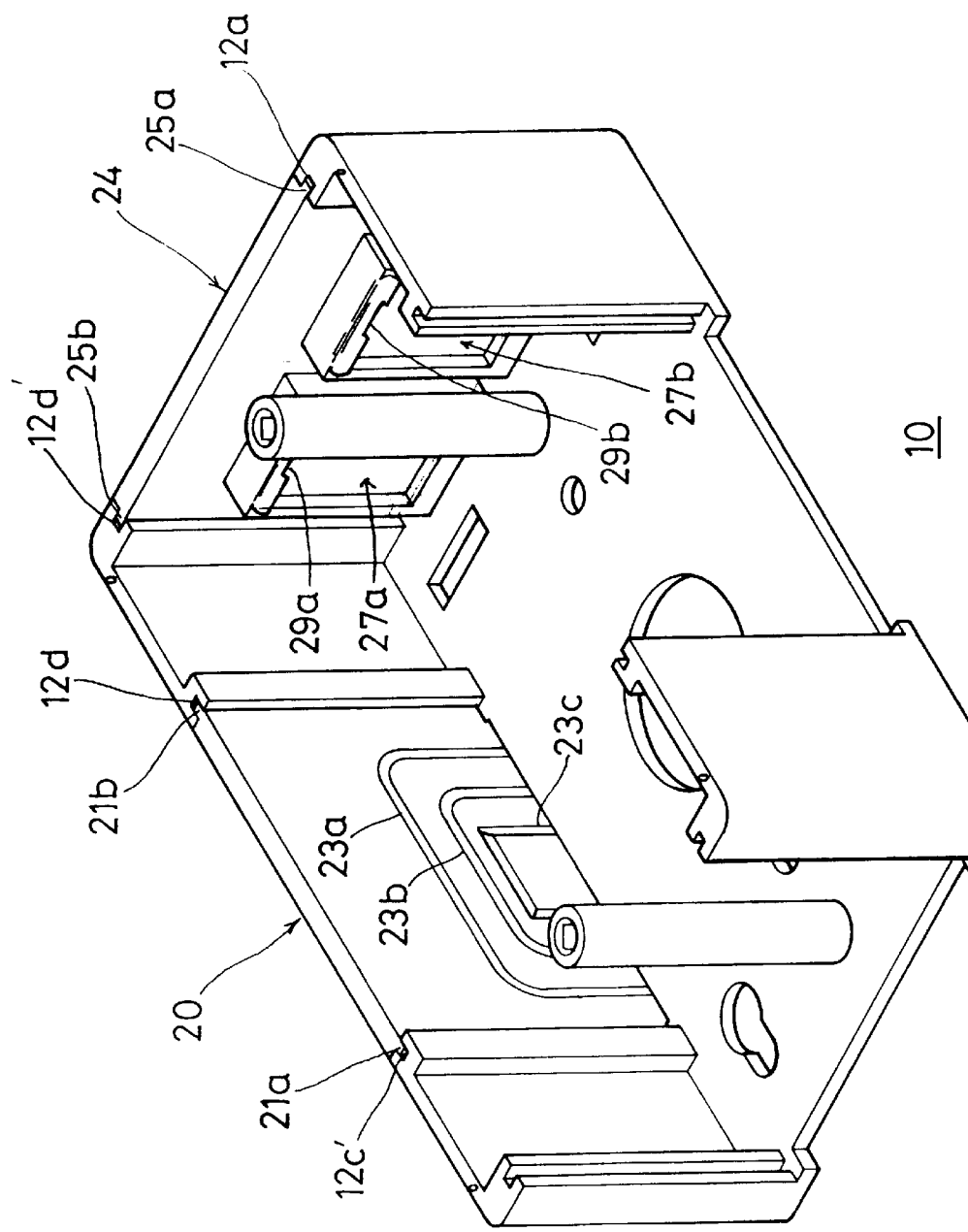
FIG. 4 is a perspective view of a combination of the base unit, the cable raceway insert, and the connector raceway insert.
Figure 5A:
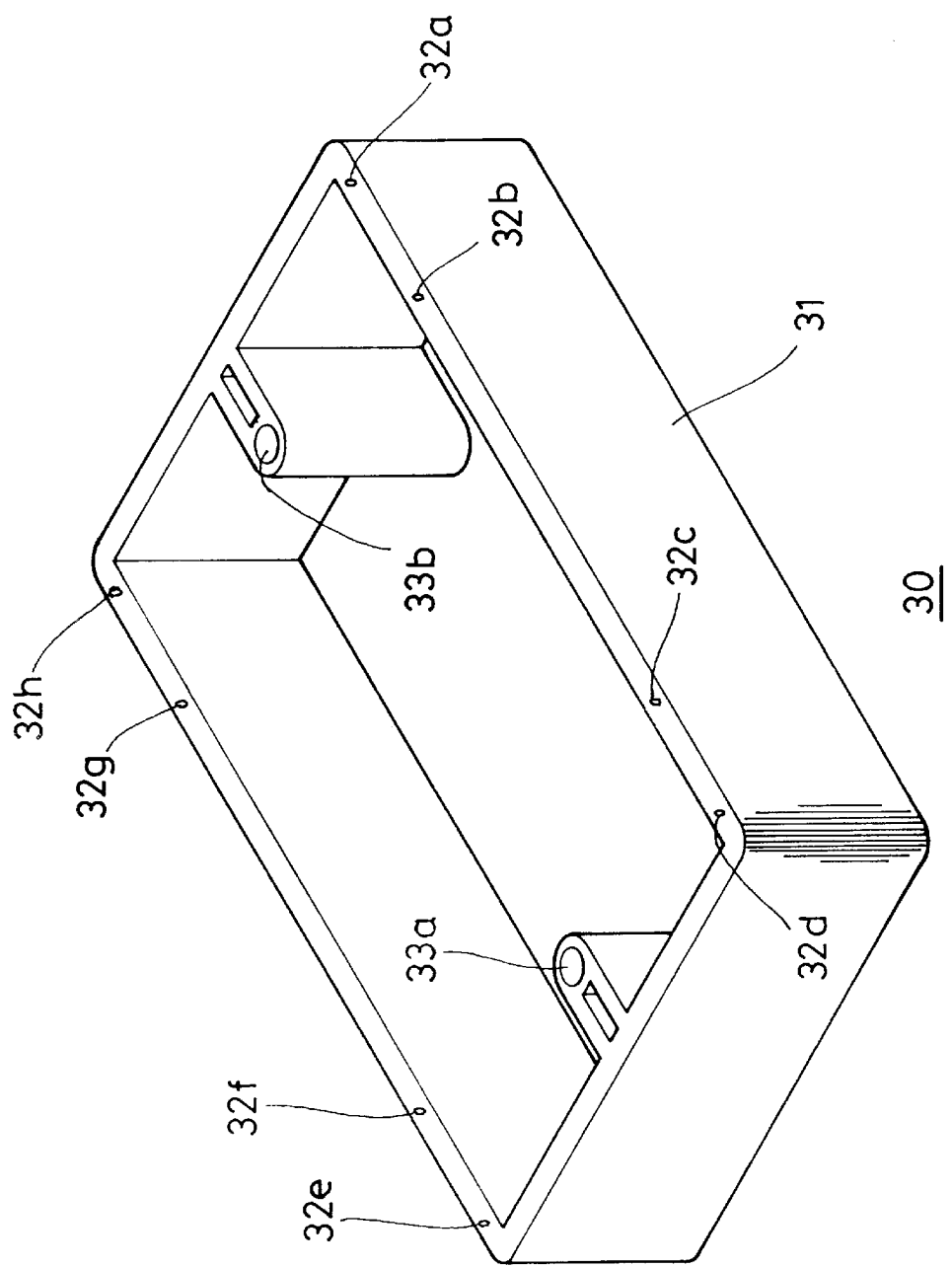
FIG. 5A is a perspective view of an extension unit employed in the first preferred embodiment of the raceway box of the present invention.
Figure 5B:
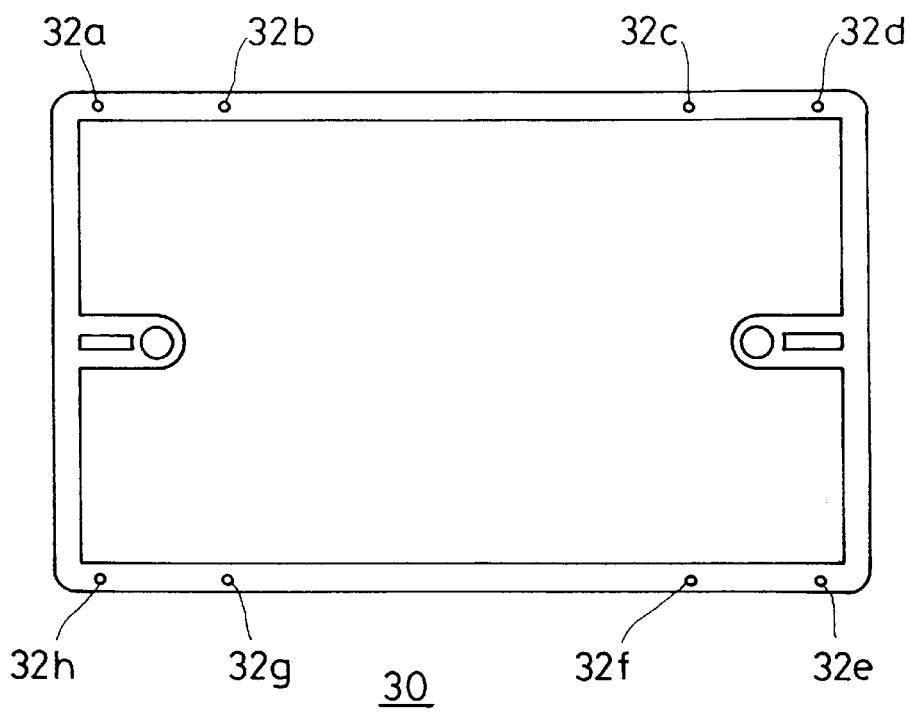
FIG. 5B is a top view of the extension unit of FIG. 5A.
Figure 5C:
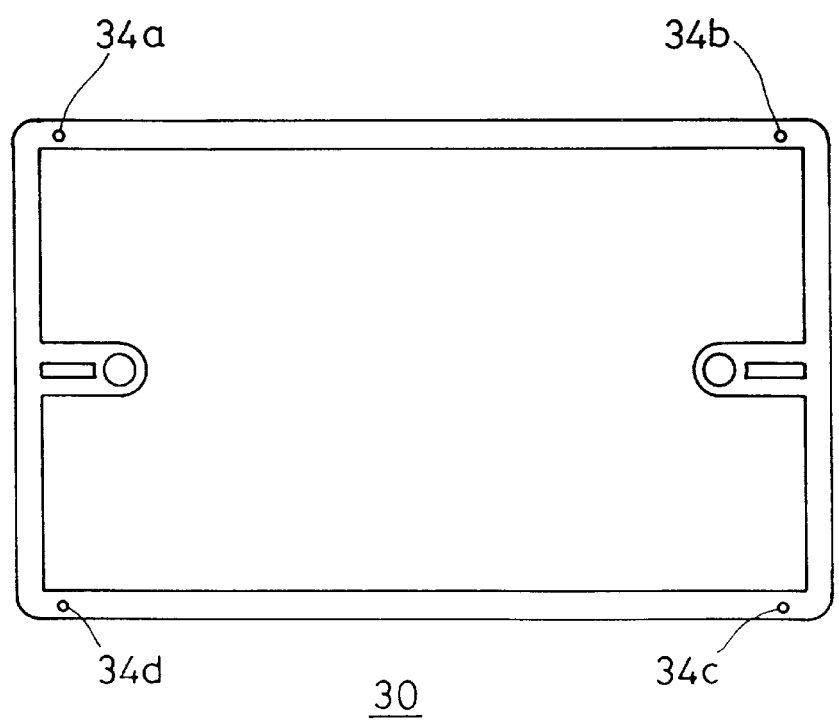
FIG. 5C is a bottom view of the extension unit of FIG. 5A.
Figure 6A:
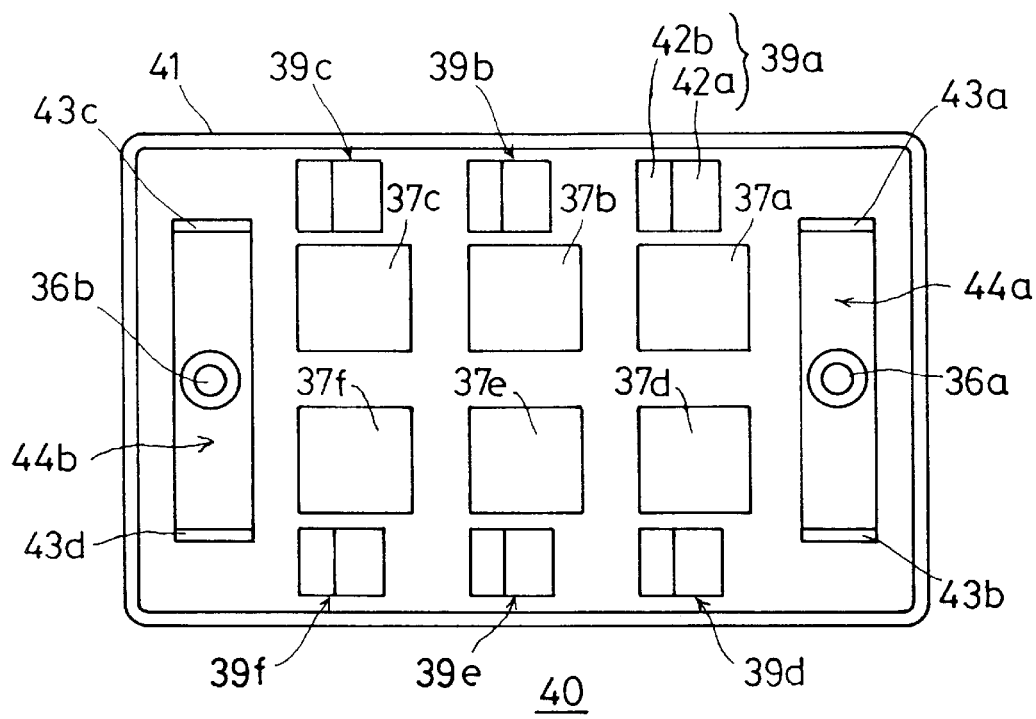
FIG. 6A is a top view of a socket panel employed in the first preferred embodiment of the raceway box of the present invention.
Figure 6B:
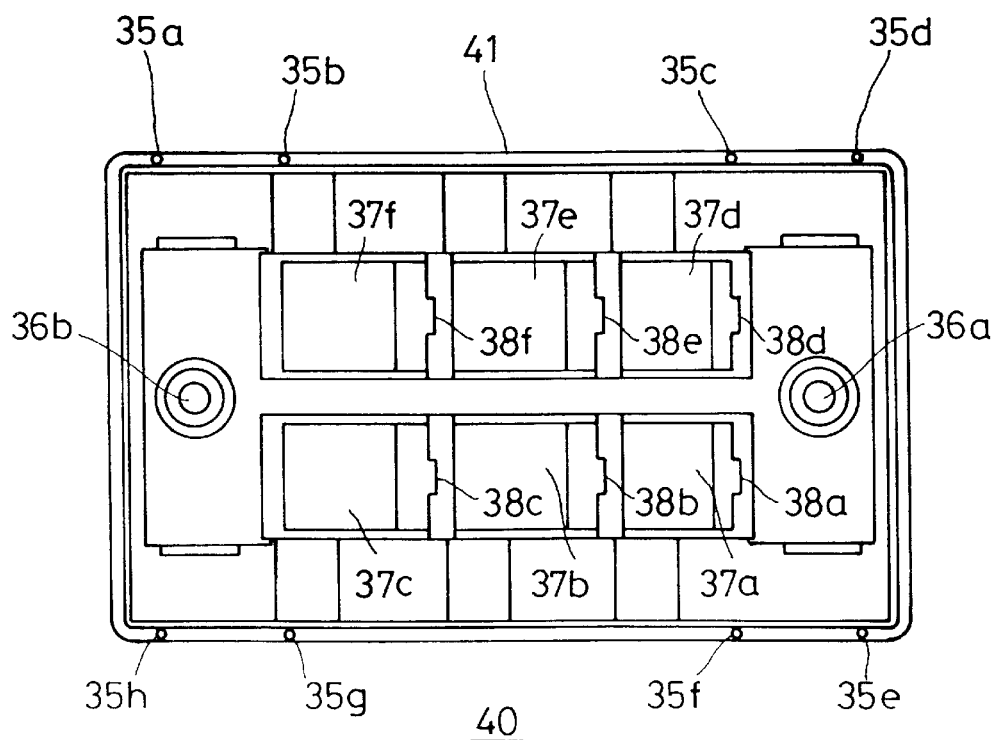
FIG. 6B is bottom view of the socket panel of FIG. 6A.
Figure 7A:
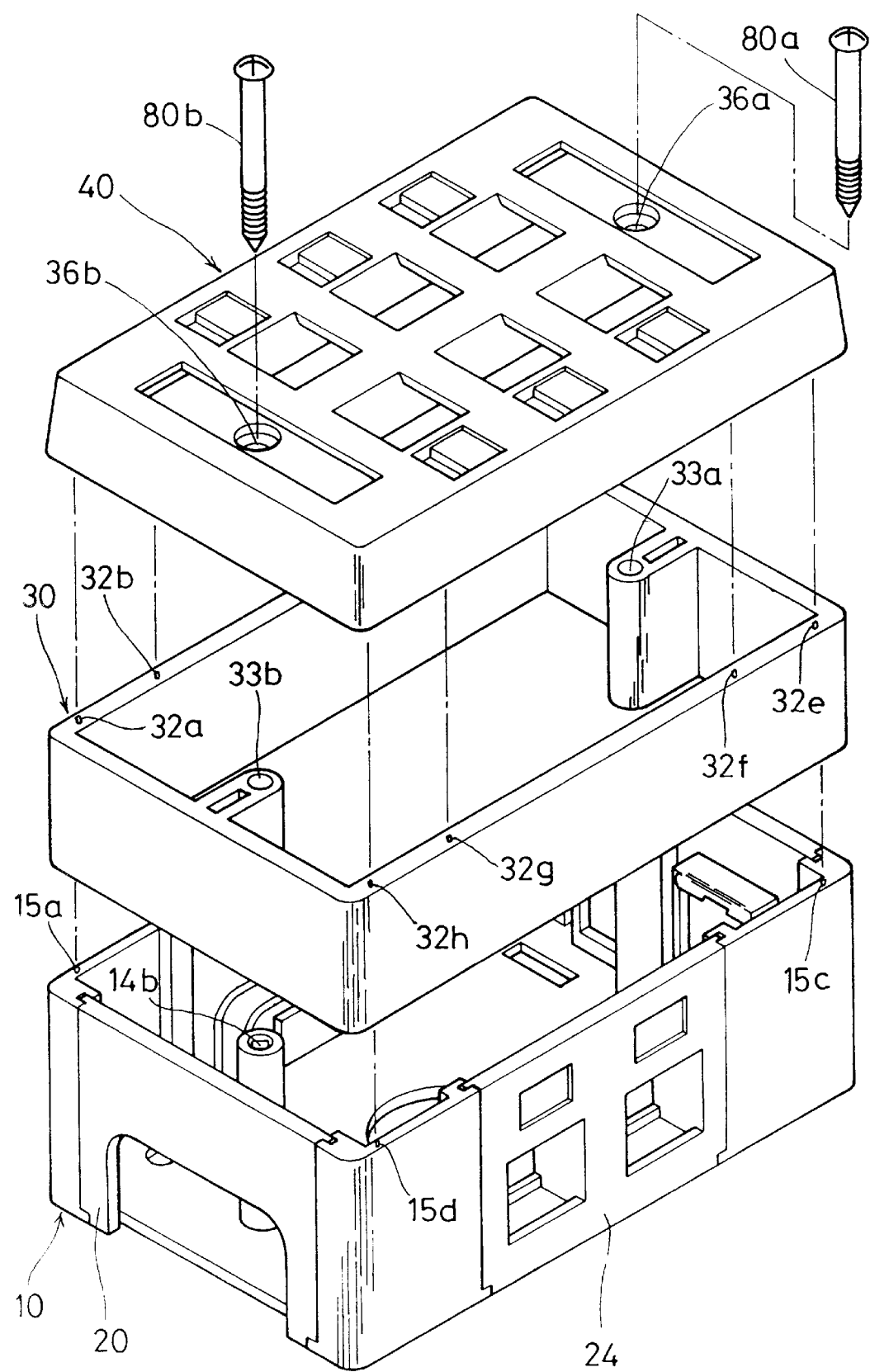
FIG. 7A is an exploded perspective view of an assembly of the first preferred embodiment of the raceway box of the present invention.
Figure 7B:
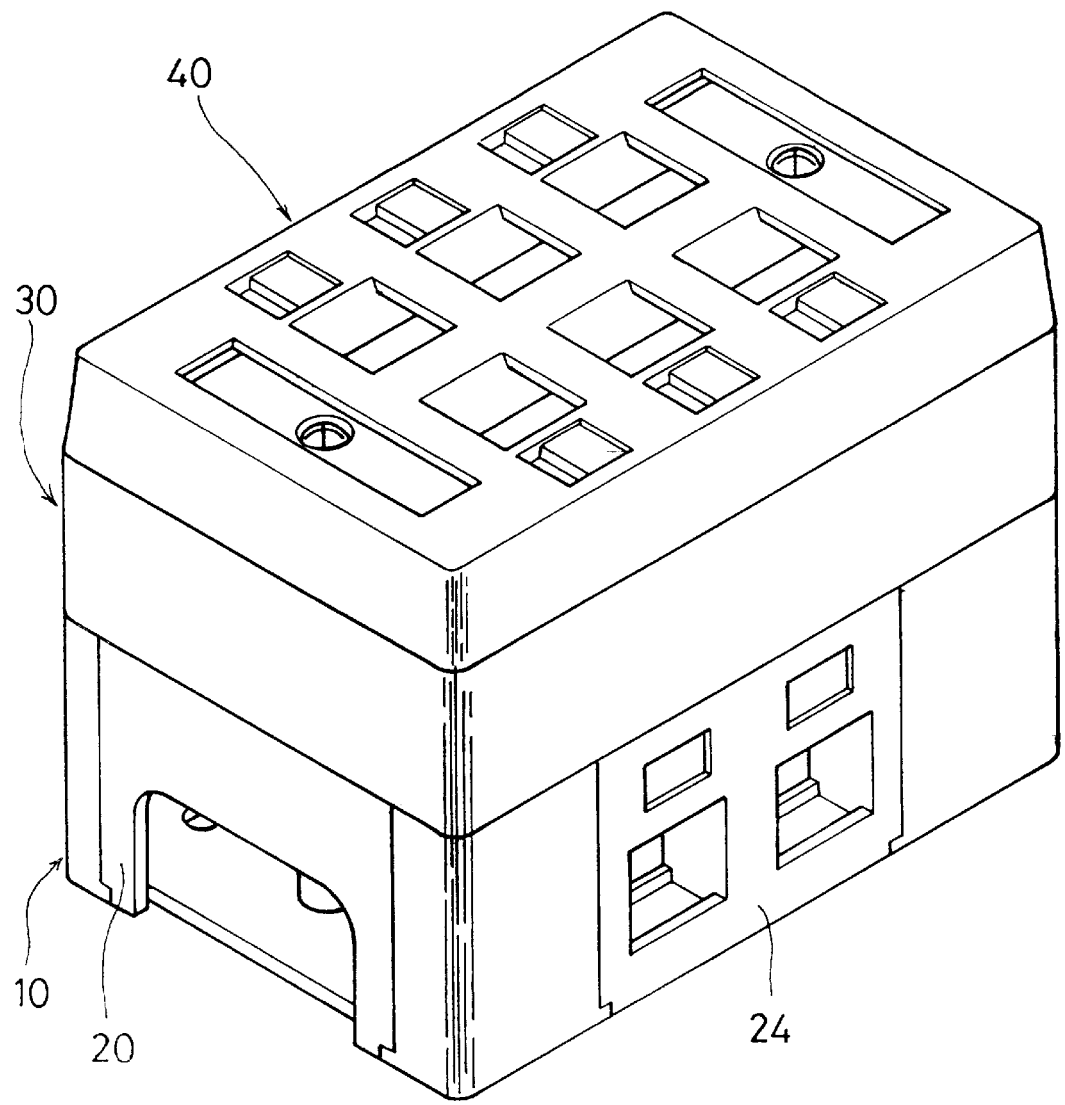
FIG. 7B is a perspective view of the raceway box of FIG. 7A when assembled.

Illustrated in FIGS. 1A–IC through 7B–7C are various elements used to construct a first preferred embodiment of the raceway box according to the present invention, which includes a base unit 10 shown in FIGS. 1A–1C, a cable raceway insert 20 shown in FIGS. 2A–2B, a connector raceway insert 24 shown in FIGS. 3A–3B, to be mounted in combination with the base unit 10 and the cable raceway insert 20, as shown in FIG. 4, an extension unit 30 shown in FIGS. 5A–5C, and a socket panel 40 shown in FIG. 6A–6B. The assembly of the first preferred embodiment of the raceway box is shown in FIGS. 7A–7B.

As shown in FIGS. 1A–1C, the base unit 10 includes a chassis 9, four upright side pieces 10a, 10b, 10c, 10d at the corners of the chassis 9, and a pair of posts 13a, 13b. Further, the four sides of the chassis 9 are formed with lateral cutaway portions 9a, 9b, 9c, 9d and the upright edges of the side pieces are formed with slide slots (12a, 12a'), (12b, 12b'), (12c, 12c'), and (12d, 12d'). The combination of the lateral cutaway portions 9a, 9b, 9c, 9d, the slide slots (12a, 12a'), (12b, 12b'), (12c, 12c'), (12d, 12d'), and respective voids between the side pieces 10a, 10b, 10c, 10d constitute four receptacles 11a, 11b, 11c, 11d, respectively, on the four sides of the base unit 10 for holding at most four inserts therein which can be either the cable raceway insert 20 shown in FIGS. 2A–2B or the connector raceway insert 24 shown in FIGS. 3A–3B.

The upright posts 13a, 13b are formed respectively with threaded holes 14a, 14b therein. These threaded holes 14a, 14b will be used later to couple the base unit 10 by means of screws with the extension unit 30 shown in FIGS. 5A–5C (when the interior space of the raceway box is to be extended) or the socket panel 40 shown in FIGS. 6A–6B. Moreover, the side pieces 10a, 10b, 10c, 10d have their top formed with small alignment points 15a, 15b, 15c, 15d respectively, which are to be used to align and secure the extension unit 30 or the socket panel 40 in position when either of them is to be combined with the base unit 10.

The chassis 9 is formed with a large circular opening 16 for receiving a cable (not shown) into the raceway box. In order to mount the raceway box on another object, for example on a wall, the chassis 9 is further formed with a plurality of screw holes including, for example, three pear-like screw holes 17a, 17b, 17c, two rectangular screw holes 18a, 18b, and one small circular screw holes 19. These screw holes 17a, 17b, 17c, 18a, 18b, 19 are selectively used to receive screws or bolts (not shown) so as to fasten the raceway box to a wall.

Referring further to FIGS. 2A–2B, the cable raceway insert 20 is a flat member having a pair of slide rails 21a, 21b on the opposite edges. The cable raceway insert 20 can be inset in any of the receptacles 11a, 11b, 11c, 11d by fitting the slide rails 21a, 21b thereon into the corresponding slide slots (12a', 12b), (12b', 12c), (12c', 12d), or (12d', 12a) on the side pieces 10a, 10b, 10c, 10d, as for example illustrated in FIG. 4. When one cable raceway insert 20 is inset in the base unit 10, the front edge 22 of the cable raceway insert 20 is positioned in the corresponding lateral cutaway portion (9a, 9b, 9c, or 9d). As shown in FIG. 3B, the cable raceway insert 20 has a rear side formed with a plurality of separable pieces 23a, 23b, 23c. These separable pieces 23a, 23b, 23c can be selectively removed so as to provide a cable inlet/outlet opening of a various size for a cable of corresponding size to pass therethrough. If a small inlet/outlet opening is desired, for example, only the separable piece 23c is removed, while if a large inlet/outlet opening is desired, the two separable pieces 23b, 23c or even all of the separable pieces 23a, 23b, 23c can be removed. The cable raceway insert 20 shown in FIG. 7A, for example, has all of its separable pieces 23a, 23b, 23c removed. In general, the cable raceway insert 20 is provided in pair in the base unit 10, one serving as an inlet for a cable and the other serving as an outlet for the same cable.

Figure 11:
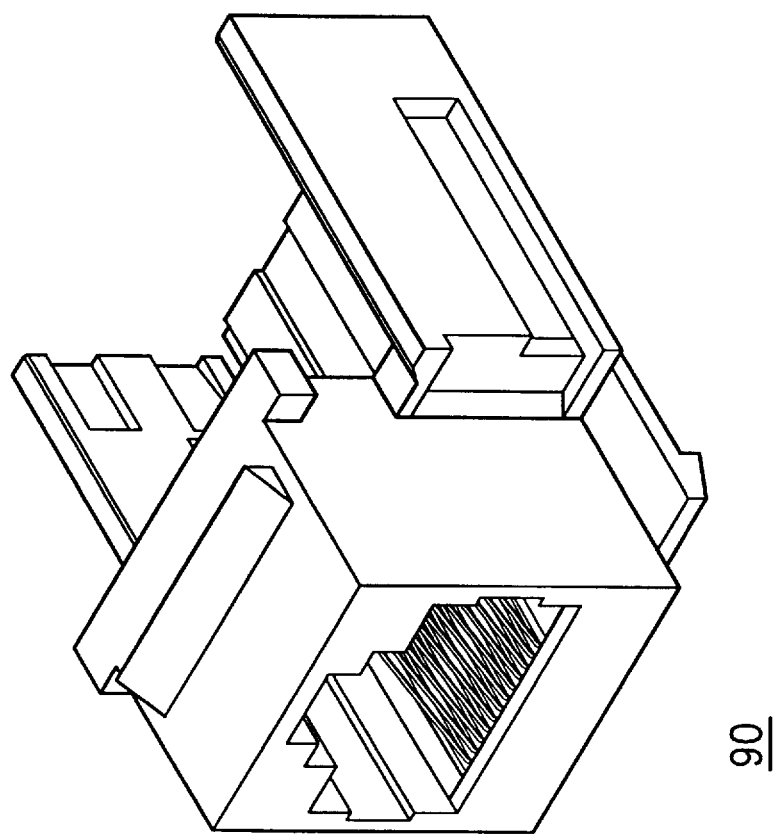
FIG. 11 is a perspective view of a plug-in type of connector.

Referring to FIGS. 3A–3B, similar to the cable raceway insert 20 the connector raceway insert 24 is also a flat member having a pair of slide rails 25a, 25b on the two opposite edges. The connector raceway insert 24 can be inset in any of the receptacles 11a, 11b, 11c, 11d by fitting the slide rails 25a, 25b thereon into the corresponding slide slots (12a', 12b), (12b', 12c), (12c', 12d), or (12d', 12a) on the side pieces 10a, 10b, 10c, 10d, as for example illustrated in FIG. 4. When one connector raceway insert 24 is inset in the base unit 10, the front edge 26 of the connector raceway insert 24 is positioned in the corresponding lateral cutaway portion (9a, 9b, 9c, or 9d). As shown in FIG. 3A, the connector raceway insert 24 has a front side formed with a pair of rectangular openings 27a, 27b for mounting connectors therein and a pair of recesses 28a, 28b for affixing indication marks therein. The rectangular openings 27a, 27b are each used to mount one connector (not shown) therein, and the recesses 28a, 28b are each used to affix an indication mark (not shown) indicating the type and use of the connector mounted thereunder. Furthermore, as shown in FIG. 3B, the connector raceway insert 24 has a rear side provided with connector holders 29a, 29b which hold the connectors (not shown) securely in position and also allows easy dismounting of the same. The rectangular openings 27a, 27b can be used to mount various types of connectors as, for example, a plug-in type of connector 90 shown in FIG. 11.

FIG. 4 shows an example of insetting the cable raceway insert 20 in a lengthwise side and the connector raceway insert 24 in a crosswise side of the raceway box. In accordance with the present invention, the cable raceway insert 20 and the connector raceway insert 24 can be inset in any of the receptacles, and can be removed easily from the same such that replacement or addition of new type of connectors can be achieved by simply insetting another connector raceway insert which is mounted with the desired type of connector thereon.

If the raceway box shown in FIG. 4 is not spacious enough in its interior space to accommodate all the interconnecting cables and wires therewithin, its top can be mounted with the extension unit 30 shown in FIGS. 5A–5C. The extension unit 30 includes a rectangular body 31 formed with a plurality of small alignment points 32a, 32b, 32c, 32d, 32e, 32f, 32g, 32h on the top as illustrated in FIG. 5B, and a plurality of small alignment holes 34a, 34b, 34c, 34d on the bottom as illustrated in FIG. 5C. The small alignment points 32a, 32b, 32c, 32d, 32e, 32f, 32g, 32h on the top are used to help assembly works to align the socket panel 40 (which will be described later) in position with extension unit 30 when combining these two members 30, 40, and the small alignment holes 34a, 34b, 34c, 34d on the bottom together with the small alignment points 15a, 15b, 15c, 15d on the base unit 10 are used to help assembly works to align the extension unit 30 in position with the base unit 10 when combining these two members 10, 30. They also help the overlaying member (30 or 40) to be secured in position without slipping sideways when the two members (10 and 30) or (30 and 40) are aligned with each other. Further, the extension unit 30 is formed with a pair of protruding pieces having threaded holes 33a, 33b therein on the crosswise inner walls. When the extension unit 30 is mounted in position on the base unit 10, these threaded holes 33a, 33b are aligned with the threaded holes 14a, 14b in the base unit 10, thus allowing the use of screws (not shown) to fasten the extension unit 30 on the base unit 10.

Referring to FIGS. 6A–6B, the socket panel 40 includes a rectangular plate 41 having a plurality of rectangular openings 37a, 37b, 37c, 37d, 37e, 37f which are selectively used to mount connectors therein. Recesses 39a, 39b, 39c, 39d, 39e, 39f are formed respectively beside these rectangular openings 37a, 37b, 37c, 37d, 37e, 37f each of which (as the recess 39a exemplifies) includes two portions 42a, 42b used to hold two pieces of labels used to indicate the type and purpose of the associated connectors.

Further, the socket panel 40 is provided with at least two threaded holes 36a, 36b therein. As shown in FIG. 7A, when the socket panel 40 is aligned in position on the extension unit 30 and base unit 10, these three members 10, 30, 40 can be fastened together by driving screws 80a, 80b through the threaded holes 36a, 36b in the socket panel 40, the threaded holes 33a, 33b in the extension unit 30, and the threaded holes 14a, 14b in the base unit 10.

Referring to FIG. 6A together with FIG. 7A, the surface areas around threaded holes 36a, 36b are slightly recessed to form receding portions 44a, 44b having slots (43a, 43b) and (43c, 43d) at two sides. Rectangular pieces (not shown) such as plastic pieces can be inset in the receding portions 44a, 44b by fitting their edges in the slots (43a, 43b) and (43c, 43d) so as to cover the screws in the threaded holes 36a, 36b for purpose of aesthetic looking and dust-proof.

Referring to FIG. 6B, the back of the socket panel 40 is provided with slots 38a, 38b, 38c, 38d, 38e, 38f which allow easy dismounting of connectors (not shown) mounted in the rectangular openings 37a, 37b, 37c, 37d, 37e, 37f by inserting, for example, the tip of a driver or the like therein to pull loose the connectors (not shown). As can be observed from the drawings, openings 37a–37f can be provided with a different configuration than openings 27a and 27b for accommodating different types of connectors. For example, openings 27a and 27b can have an elongated, rectangular shape (as shown in FIGS. 3A and 3B), for receiving a first type of connector, and openings 37a–37f can have a square shape (as shown in FIGS. 6A and 6B), for receiving a second type of connector. Further, a plurality of small alignment holes 35a, 35b, 35c, 35e, 35f, 35g, 35h are provided on the back. These small alignment holes 35a, 35b, 35c, 35e, 35f, 35g, 35h together with the small alignment points 32a, 32b, 32c, 32d, 32e, 32f, 32g, 32h on the extension unit 30 allow easy alignment and securing of the socket panel 40 in position on the extension unit 30 when combining these two members 30, 40.

Referring to FIGS. 7A–7B, the base unit 10, the extension unit 30, and the socket panel 40 are combined to form the raceway box. In the first step, the extension unit 30 is aligned and secured in position on top of the base unit 10 with the help of the small alignment holes 34a, 34b, 34c, 34d on the bottom of the extension unit 30 and the corresponding small alignment points 15a, 15b, 15c, 15d on the top of the base unit 10. Next, in a similar way, the socket panel 40 is aligned and secured in position on the extension unit 30 with the help of the small alignment holes 35a, 35b, 35c, 35e, 35f, 35g, 35h on the bottom of the socket panel 40 and the corresponding small alignment points 32a, 32b, 32c, 32d, 32e, 32f, 32g, 32h on the top of the extension unit 30. Finally, when the three members 10, 30, 40 are put together, they can be fastened by driving screws 80a, 80b through the threaded holes 36a, 36b in the socket panel 40, the threaded holes 33a, 33b in the extension unit 30, and the threaded holes 14a, 14b in the base unit 10. The assembled raceway box is shown in FIG. 7B.

Second Preferred Embodiment

Figure 8B:
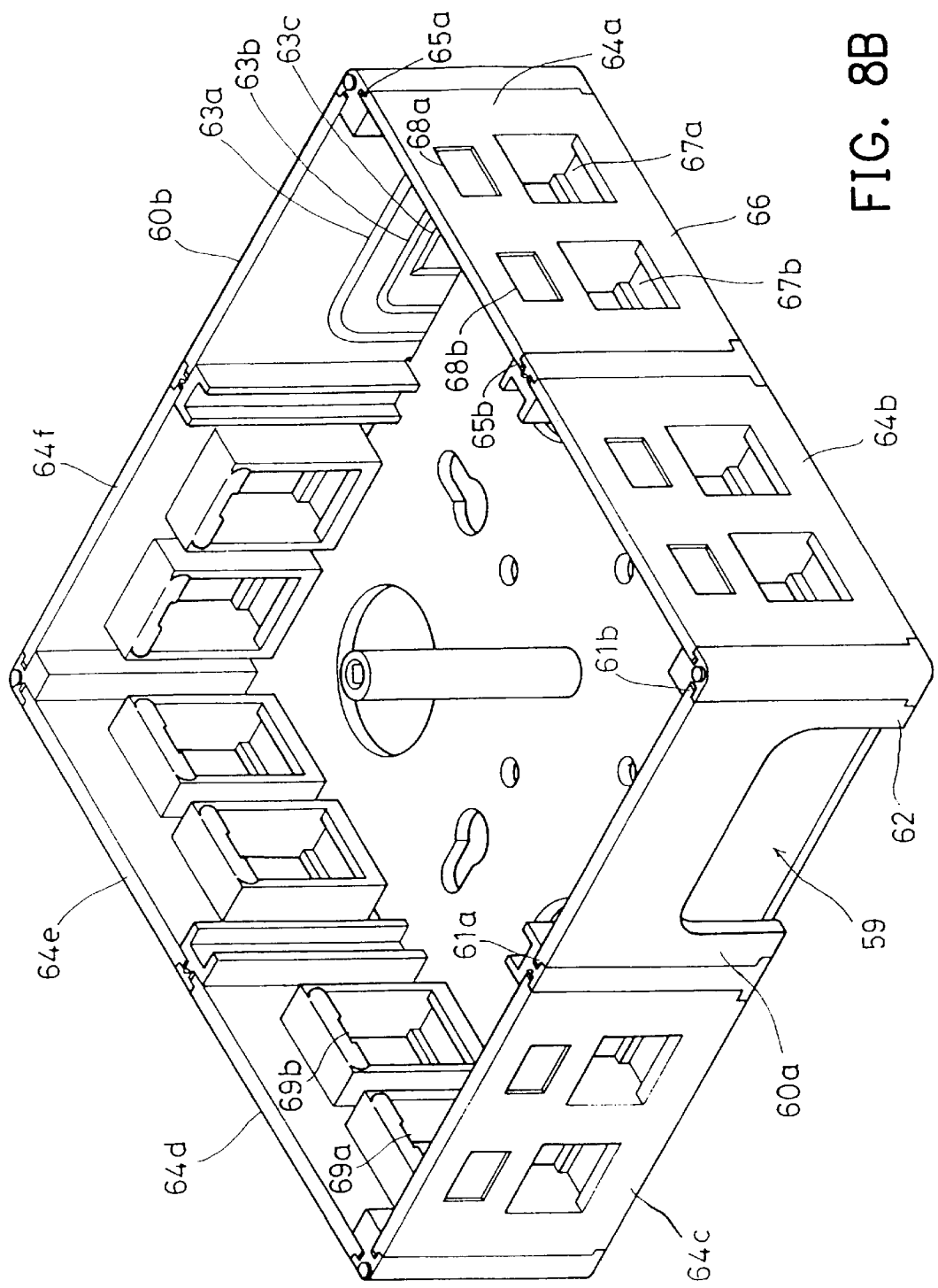
FIG. 8B is a perspective view of an assembly of the second preferred embodiment of the raceway box according to the present invention.
Figure 8C:
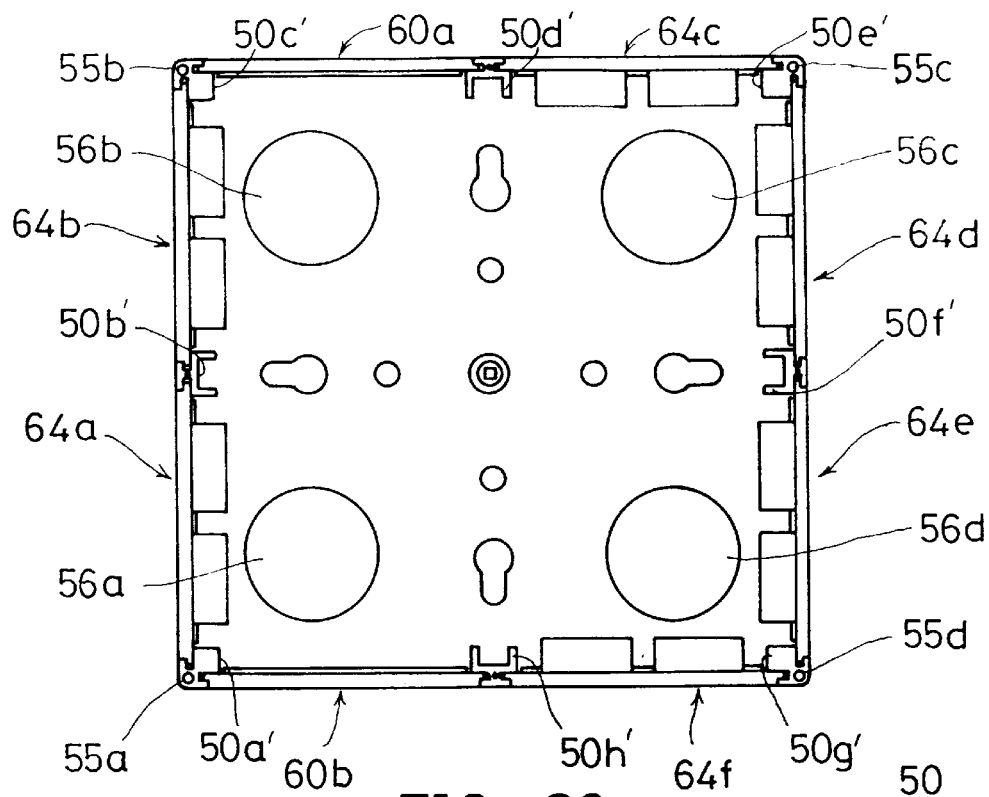
FIG. 8C is a top view of the assembly of FIG. 8B.
Figure 8D:
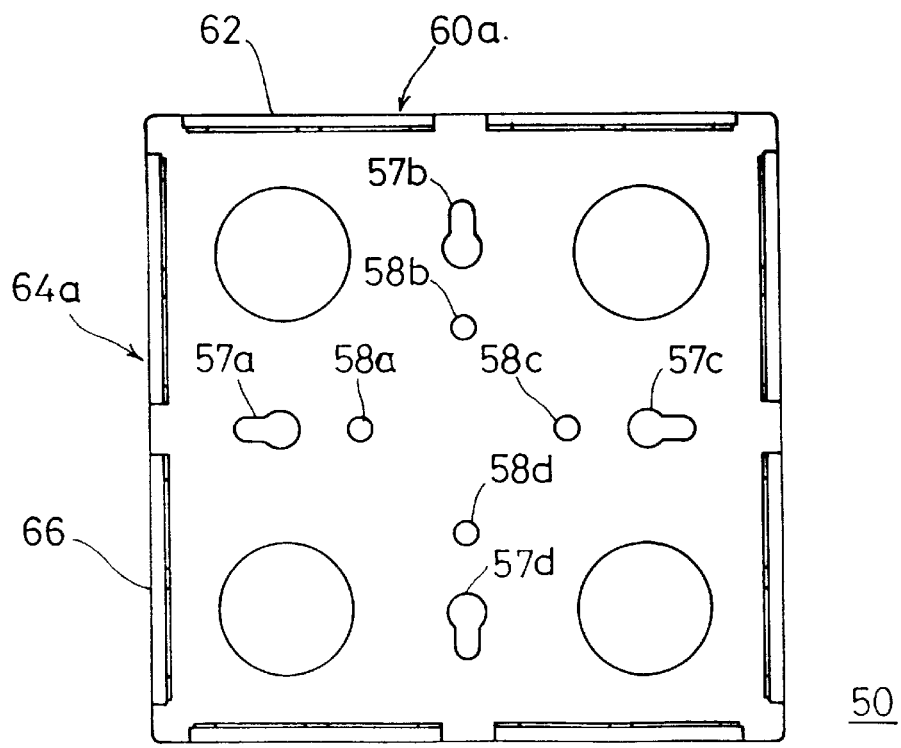
FIG. 8D is a bottom view of the assembly of FIG. 8B.
Figure 9A:
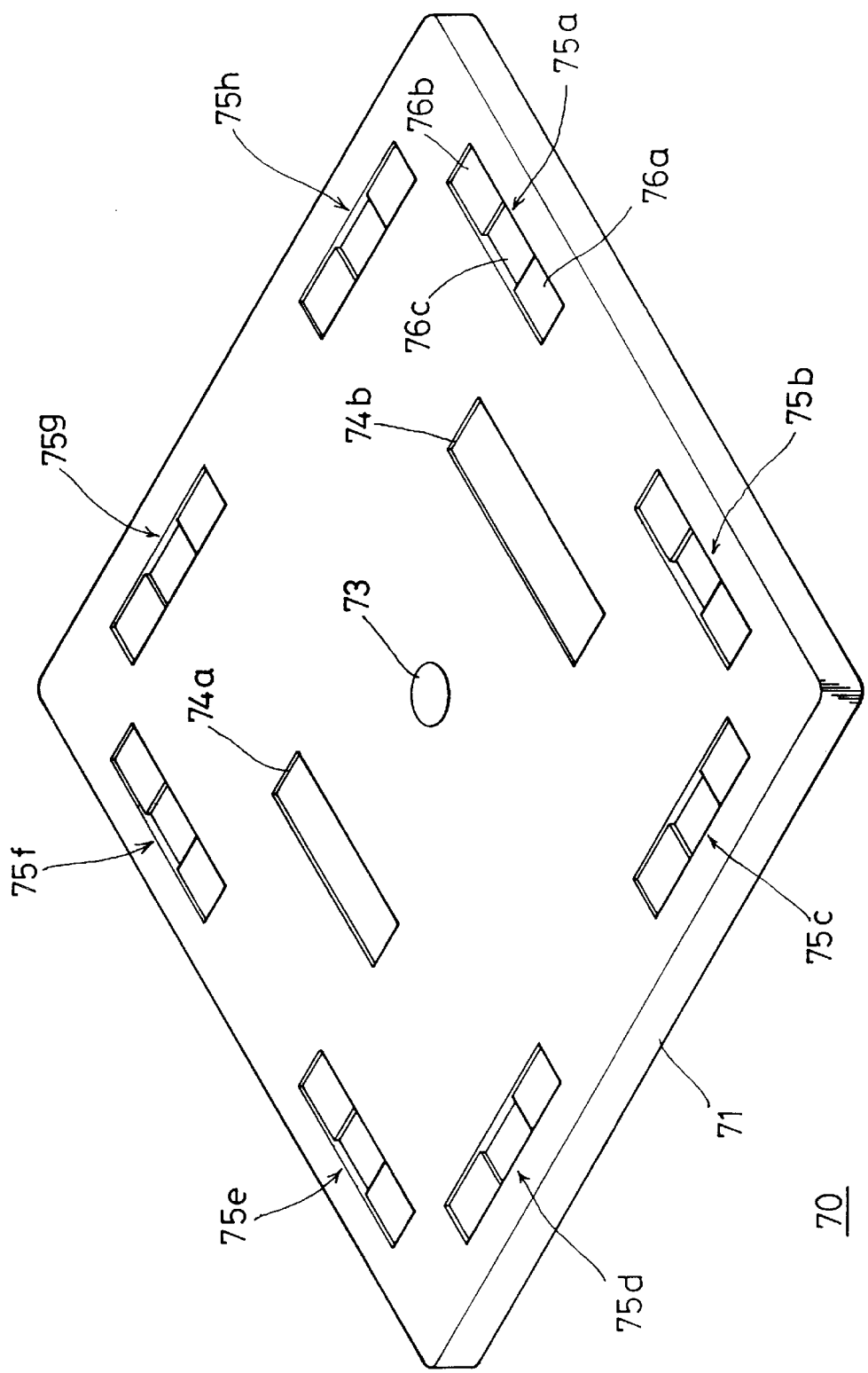
FIG. 9A is a perspective view of an indicator panel employed in the second preferred embodiment of the raceway box of the present invention.
Figure 9B:
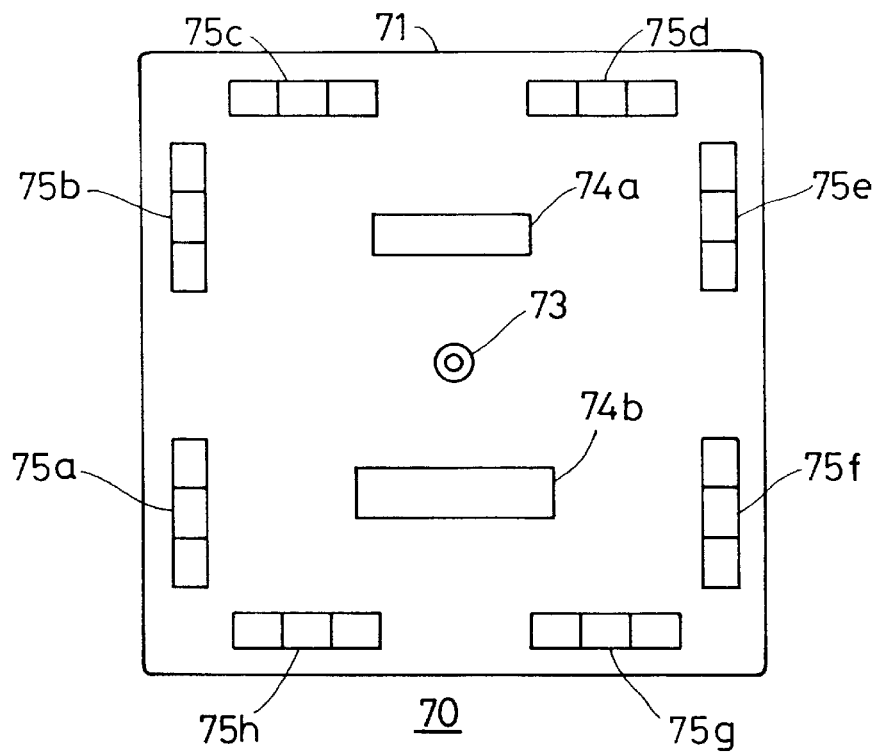
FIG. 9B is a top view of the indicator panel of FIG. 9A.
Figure 9C:
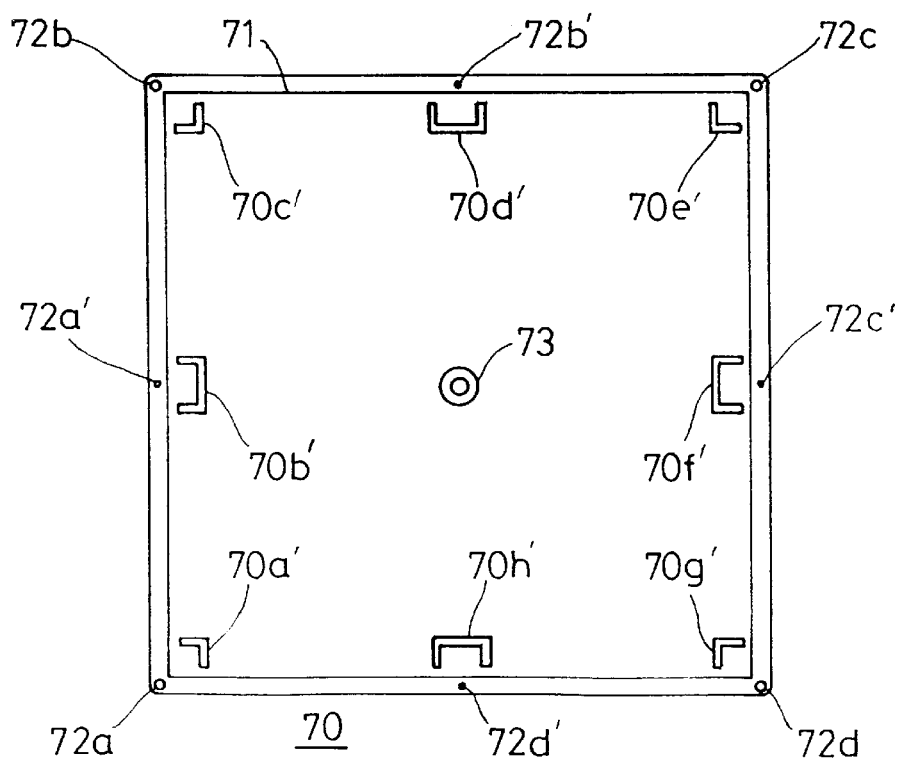
FIG. 9C is a bottom view of the indicator panel of FIG. 9A.
Figure 10A:
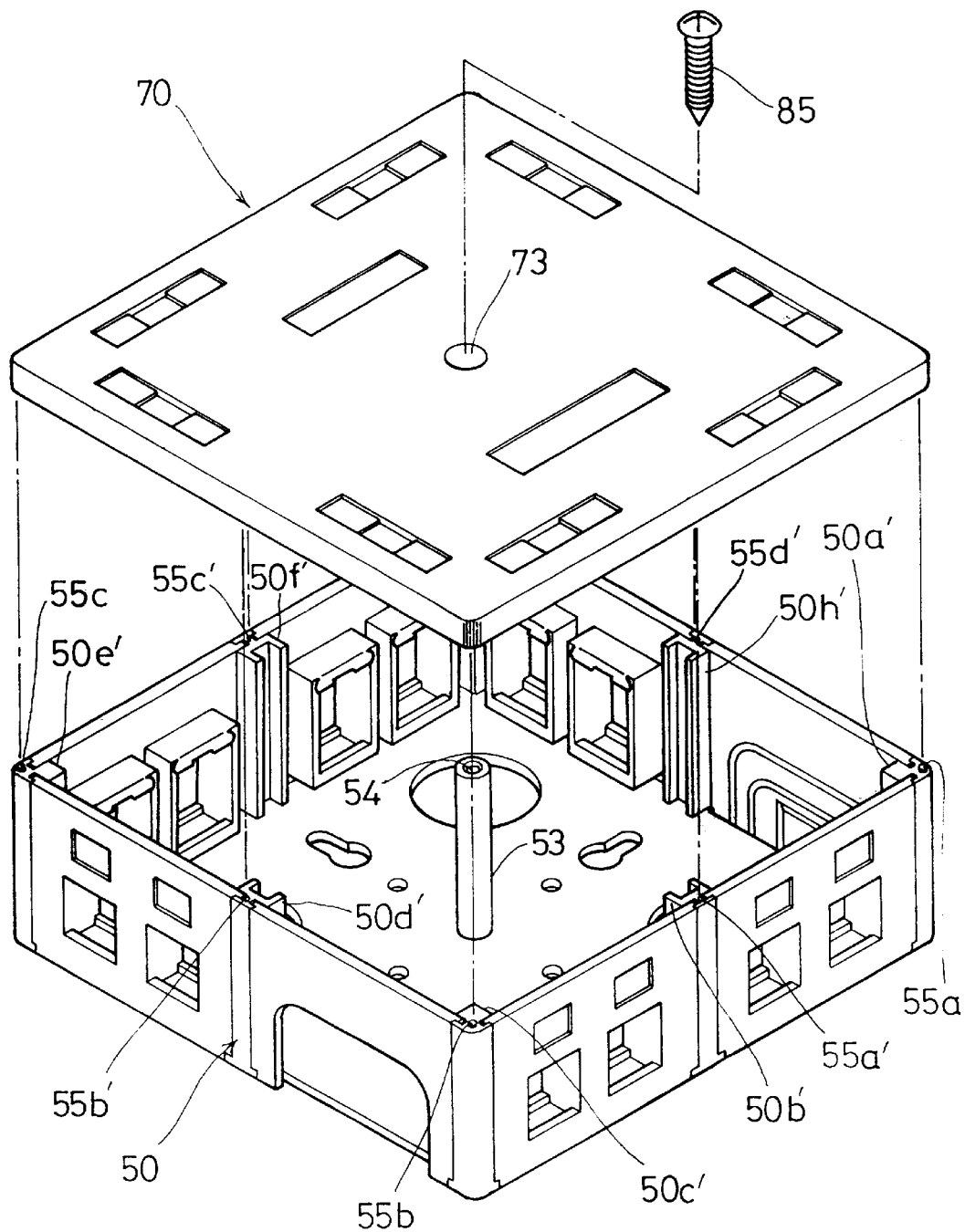
FIG. 10A is an exploded perspective view of an assembly of the second preferred embodiment of the raceway box of the present invention.
Figure 10B:
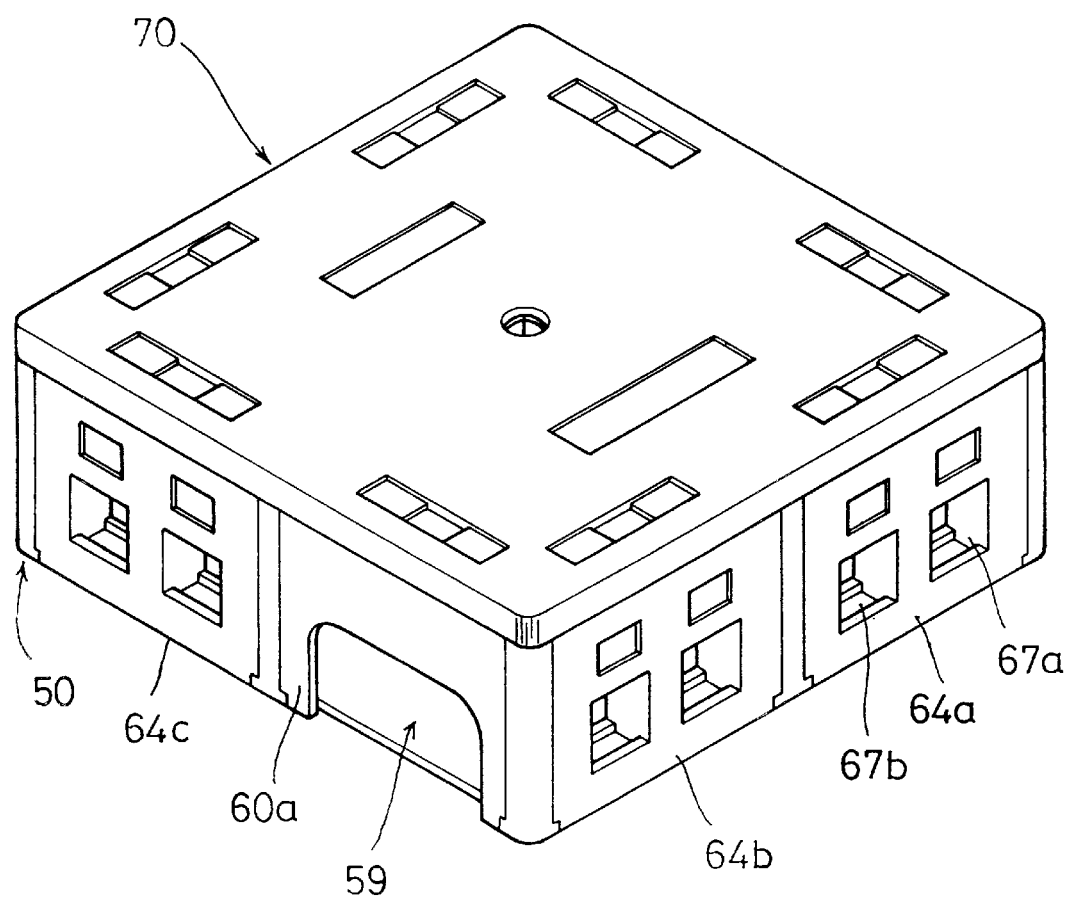
FIG. 10B is a perspective view of the raceway box of FIG. 10A when assembled.

Illustrated in FIGS. 8A–8D through 10A–10B are various elements used to construct a second preferred embodiment of the raceway box according to the present invention, including a base unit 50 shown in FIGS. 8A–8D and an indication panel 70 shown in FIGS. 9A–9C. The assembly of the first preferred embodiment of the raceway box is shown in FIGS. 10A–10B.

Referring to FIG. 8A, the base unit 50 here differs from the base unit 10 in the first preferred embodiment in that the base unit 50 is provided with eight receptacles instead of four for holding at most eight inserts which can be either the cable raceway insert 20 shown in FIGS. 2A–2B or the connector raceway insert 24 shown in FIGS. 3A–3B. The base unit 50 includes a chassis 49 having eight upright side pieces 50a, 50b, 50c, 50d, 50e, 50f, 50g, 50h on the edge. The side pieces 50a, 50c, 50e, 50g are substantially L-shaped in section and mounted on the four corners of the chassis 49, and the other four side pieces 50b, 50d, 50f, 50h are each flat in section and mounted at the midpoint of one side of the chassis 49. Further, the four sides of the chassis 49 are formed with lateral cutaway portions 49a, 49b, 49c, 49d, 49e, 49f, 49g, 49h, between each neighboring pair of the side pieces 50a, 50b, 50c, 50d, 50e, 50f, 50g, 50h, and along the upright edges of the side pieces 50a, 50b, 50c, 50d, 50e, 50f, 50g, 50h are there formed with slide slots (52a, 52b), (52c, 52d), (52e, 52f), (52g, 52h), (52i, 52j), (52k, 52l), (52m, 52n), (52o, 52p). Each neighboring pair of side pieces together with the associated pair of slide slots and lateral cutaway portion form one receptacle which can receive an insert, either the cable raceway insert 20 or the connector raceway insert 24, therein. As shown in FIG. 8A, eight of such receptacles as respectively indicated by 51a, 51b, 51c, 51d, 51e, 51f, 51g, 51h are provided.

FIG. 8B shows, for example, the insetting of two cable raceway inserts 60a, 60b and six connector raceway inserts 64a, 64b, 64c, 64d, 64e, 64f in the base unit 50. The cable raceway inserts 60a, 60b are identical in structure as the cable raceway insert 20 shown in FIGS. 2A–2B, and the connector raceway inserts 64a, 64b, 64c, 64d, 64e, 64f are identical in structure as the connector raceway insert 24 shown in FIGS. 3A–3B. FIG. 8C further shows a top view of the assembly of FIG. 8B, and FIG. 8D shows a bottom view of the same.

The inserts, whether cable raceway insert or connector raceway insert, can be inset in the receptacles by fitting its slide rails into the slide slots on the associated side pieces. For example as shown in the FIG. 8B, the cable raceway insert 60a is inset in one receptacle on the base unit 50 by fitting its slide rails 61a, 61b into the slide slots on two neighboring side pieces. When the cable raceway insert 60a is inset in one receptacle, its front edge 62 is positioned in the corresponding lateral cutaway portion. In the example of FIG. 8B, the cable raceway insert 60b has its three separable pieces 63a, 63b, 63c remain unremoved and the cable raceway insert 60a has all of its separable pieces removed to provide a cable inlet/outlet opening 59 for receiving a cable (not shown) into the raceway box. The connector raceway inserts 64a, 64b, 64c, 64d, 64e, 64f are inset in the receptacles in the same way. In the example of FIG. 8B, the connector raceway insert 64a is inset in one receptacle on the base unit 50 by fitting its slide rails 65a, 65b into the slide slots on two neighboring side pieces. When the connector raceway insert 64a is inset in one receptacle, its front edge 66 is positioned in the corresponding lateral cutaway portion. The rectangular openings 67a, 67b in the connector raceway insert 64a can be used to mount various types of connectors as, for example, a plug-in type of connector 90 shown in FIG. 11. What types of connectors are used are labeled on the indication marks 68a, 68b above the rectangular openings 67a, 67b.

Further, an upright post 53 having a threaded hole 54 therein is formed at the center of the chassis 49. Four upright columns 50a', 50c', 50e', 50g'which are square in section are provided respectively beside the side pieces 50a, 50c, 50e, 50g, and four other upright columns 50b', 50d', 50f', 50h'which are substantially U-shaped in section are provided respectively beside the side pieces 50b, 50d, 50f, 50h. Further, on the top of the side pieces 50a, 50c, 50e, 50g are there formed with a plurality of large alignment points 55a, 55b, 55c, 55d, and on the top of the side pieces 50b, 50d, 50f, 50h are there formed with a plurality of small alignment points 55a', 55b', 55c', 55d'.

Similar to the first preferred embodiment, the chassis 49 here is also formed with a plurality of screw holes including four pear-like screw holes 57a, 57b, 57c, 57d and four circular screw holes 58a, 58b, 58c, 58d which allow screws (not shown) to drive therethrough to fasten the raceway box to another object as a wall. Further, the chassis 49 is formed with four large circular openings 56a, 56b, 56c, 56d for receiving cables into the raceway box. The number of the screw holes and openings formed here is based on design choice and not intended to limit the scope of the present invention.

The top of the base unit 50 is to be covered with the indication panel 70 shown in FIGS. 9A–9C. As illustrated in FIGS. 9A and 9B, the indication panel 70 is a rectangular plate 71 having a plurality of rectangular recesses, including, for example, a first type of rectangular recesses 74a, 74b and a second type of rectangular recesses 75a, 75b, 75c, 75d, 75e, 75f, 75g. The first type of rectangular recesses 74a, 74b are used to affix marks indicating, for example, what types of systems the raceway box is tied to; and the second type of rectangular recesses 75a, 75b, 75c, 75d, 75e, 75f, 75g are used to affix marks indicating, for example, what types of cables the associated inserts, whether cable raceway insert or connector raceway insert, receive. The second type of rectangular recesses 75a, 75b, 75c, 75d, 75e, 75f, 75g are each formed with three receding portions 76a, 76b, 76c so as to affix marks of various lengths.

FIG. 9C shows the back of the indication panel 70, which includes a plurality of aligning separators 70a', 70b', 70c', 70d', 70e', 70f', 70g', 70h', of which the aligning separators 70a', 70c', 70e', 70g'are substantially L-shaped in section and the aligning separators 70b', 70d', 70f', 70h'are substantially U-shaped in section. These aligning separators 70a', 70b', 70c', 70d', 70e', 70f', 70g', 70h'are provided in alignment with the upright columns 50a', 50b', 50c', 50d', 50e', 50f', 50g', 50h'on the base unit 50 when the indication panel 70 is mounted in position on the base unit 50. Further, a plurality of alignment holes including four large alignment holes 72a, 72b, 72c, 72d and small alignment holes 72a', 72b', 72c', 72d'which, together with the large alignment points 55a, 55b, 55c, 55d small alignment points 55a', 55b', 55c', 55d'on the base unit 50, are used to help the assembly workers to align the indication panel 70 on the base unit 50. They also help securing the 70 in position on the base unit 50 when the two members 50, 70 are put together. At the middle of the rectangular plate 71 is there provided with a screw hole 73 which is in alignment with the threaded hole 54 in the post 53 on the base unit 50.

Referring further to FIGS. 10A–10B, during assembly of the raceway box, the first step is to align and secure the indication panel 70 in position on the base unit 50 with the help of the alignment holes (72a, 72b, 72c, 72d and 72a', 72b', 72c', 72d') on the bottom of the indication panel 70 and the alignment points (55a, 55b, 55c, 55d and 55a', 55b', 55c', 55d') on the base unit 50. When the two members 50, 70 are put together, they can be fastened by driving a screw 85 through the screw hole 73 in the indication panel 70 and the threaded hole 54 in the post 53 on the base unit 50. The assembled raceway box is shown in FIG. 10B.

The present invention has been described hitherto with exemplary preferred embodiments. However, it is to be understood that the scope of the present invention need not be limited to the disclosed preferred embodiments. On the contrary, it is intended to cover various modifications and similar arrangements within the scope defined in the following appended claims. The scope of the claims should be accorded the broadest interpretation so as to encompass all such modifications and similar arrangements.

What is claimed is:

1. A raceway box, comprising:
   (a) a base unit including a chassis having a plurality of side pieces mounted substantially upright on an edge of said chassis, said plurality of side pieces defining a plurality of receptacles therebetween;
   (b) at least one connector raceway insert, which is inset in one of said receptacles so as to fill a space between respective adjacent ones of said side pieces and having an opening for mounting at least a first type of connector therein;
   (c) a socket panel having at least one opening for mounting at least a second type of connector therein, said socket panel covering said base unit; and
   (d) means for securing said scket panel on said base unit.

2. The raceway box of claim 1, further comprising at least one cable raceway insert, which is inset in one of said receptacles, for receiving at least a cable therein.

3. The raceway box of claim 1, further comprising:
   means for aligning said socket panel on said base unit before said socket panel is fastened to said base unit.

4. A raceway box, comprising:
   a base unit having a chassis, and a plurality of side pieces mounted on an edge of said chassis and extending in a direction essentially perpendicular to a surface of said chassis, each of said side pieces being separated from an adjacent side piece by a space so as to form a receptacle located between each two respective adjacent ones of said side pieces, with each respective receptacle being located at the edge of the chassis;
   at least one removable and replaceable insert located within one of said receptacles so as to fill the space between the respective adjacent side pieces, and having an opening for mounting a first connector therein; and
   a removable panel covering said base unit, and being arranged to be essentially parallel to the surface of said chassis, said panel having at least one opening for mounting a second connector therein.

5. The raceway box of claim 4, wherein said removable panel comprises a socket panel.

6. The raceway box of claim 5, wherein said at least one insert comprises a plurality of inserts, with at least one of said inserts being a cable raceway insert adapted for receiving a cable therein.

7. The raceway box of claim 6, wherein said side pieces are each formed with a pair of slide slots on opposite upright edges; and said chassis is formed with a plurality of lateral cutaway portions each corresponding to one of said receptacles.

8. A raceway box according claim 7, wherein said connector raceway insert is formed with a pair of slide rails on opposite edges, allowing said connector raceway insert to be inset in one of said receptacles by fitting said slide rails into corresponding ones of said slide slots on the two side pieces that define said one of said receptacles.

9. The raceway box of claim 1, wherein said cable raceway insert is formed with a pair of slide rails on opposite edges, allowing said cable raceway insert to be inset in one of said receptacles by fitting said slide rails into corresponding ones of said slide slots on the two side pieces that define said one of said receptacles.

10. The raceway box of claim 5, further comprising means for securing said socket panel on said base unit, and means for aligning said socket panel on said base unit before said socket panel is fastened to said base unit, wherein said aligning means includes:

at least an alignment point on the top of said base unit; and at least an alignment hole formed on the bottom of said socket panel, said alignment hole receiving said alignment point when said socket panel is aligned with said base unit.

11. The raceway box of claim 5, further comprising an extension unit immovably mounted between said base unit and said socket panel.

12. The raceway box of claim 11, wherein said extension unit includes:

means for aligning said extension unit on said base unit before said extension unit is fastened to said base unit.

13. The raceway box of claim 4, wherein said removable panel comprises an indication panel.

14. The raceway box of claim 13, wherein said at least one insert comprises a plurality of inserts, with at least one of said inserts comprising at least one cable raceway insert, which is inset in one of said receptacles, for receiving at least a cable into said raceway box, and wherein said side pieces are each formed with a pair of slide slots on opposite upright edges, said cable raceway insert being provided with a pair of slide rails on opposite edges, so as to allow said cable raceway insert to be inset in one of said receptacles by fitting said slide rails into corresponding ones of said slide slots on the two side pieces that define said one of said receptacles.

15. The raceway box of claim 14, wherein said cable raceway insert includes a plurality of separable pieces which can be selectively removed to provide an inlet/outlet opening with a desired cross section for receiving at least the cable into said raceway box.

16. The raceway box of claim 13, wherein said chassis includes at least one pear-like opening and at least one elongated rectangular opening for screws to drive through to mount the raceway box on a surface, said pear-like opening allowing one of said screw to be of various size, and said rectangular opening allowing said raceway box to be adjustable in position on the surface, said pear-like opening extending in a first direction, and said rectangular opening extending in a second direction that is perpendicular to the first direction so that the position of the raceway box can be adjusted in both the first and second directions.

17. The raceway box of claim 13, wherein said base unit includes at least one column provided beside one of said side pieces.

18. The raceway box of claim 17, wherein said indication panel includes at least one aligning separator at a position corresponding to said column on said base unit, said aligning separator being coupled with said column when said indication panel is mounted in position on said base unit, and wherein a top of said side pieces are provided with an alignment point for engagement with said indication panel.

19. The raceway box of claim 18, wherein said aligning separator on said indication panel is substantially L-shaped in section if said aligning separator is mounted at one corner of said indication panel, and substantially U-shaped if said aligning separator is mounted in the midpoint of one edge of said indication panel, and wherein said indication panel is provided with an alignment hole in registration with a corresponding alignment point for receiving the alignment point therein.

* * * * *